US012609569B2

(12) United States Patent
Tanaka

(10) Patent No.: US 12,609,569 B2
(45) Date of Patent: Apr. 21, 2026

(54) ROTATING ELECTRIC MACHINE

(71) Applicant: HONDA MOTOR CO., LTD., Tokyo (JP)

(72) Inventor: Shingo Tanaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 196 days.

(21) Appl. No.: 18/473,360

(22) Filed: Sep. 25, 2023

(65) Prior Publication Data

US 2024/0113583 A1 Apr. 4, 2024

(30) Foreign Application Priority Data

Sep. 29, 2022 (JP) ................................. 2022-156412

(51) Int. Cl.
*H02K 1/32* (2006.01)
*B64D 27/24* (2024.01)
*B64D 27/30* (2024.01)

(52) U.S. Cl.
CPC .............. *H02K 1/32* (2013.01); *B64D 27/30* (2024.01)

(58) Field of Classification Search
CPC ........ B64D 27/24; B64D 27/30; B64D 33/08; H02K 1/32; H02K 9/06
USPC .......................................................... 310/61
See application file for complete search history.

(56) References Cited

U.S. PATENT DOCUMENTS

| | | | | |
|---|---|---|---|---|
| 8,928,195 | B2 * | 1/2015 | Ohashi ..................... | H02K 9/19 |
| | | | | 310/58 |
| 9,030,062 | B2 * | 5/2015 | Matsumoto .............. | H02K 1/32 |
| | | | | 310/58 |
| 9,300,189 | B2 * | 3/2016 | Hautz ....................... | H02K 9/10 |
| 9,806,572 | B2 * | 10/2017 | Yamagishi ............... | H02K 9/19 |
| 9,847,682 | B2 * | 12/2017 | Takahashi ................ | H02K 1/28 |
| 10,707,726 | B2 * | 7/2020 | Manabe ................... | H02K 1/32 |
| 10,778,053 | B2 * | 9/2020 | Ito .......................... | H02K 7/085 |
| 11,018,539 | B2 * | 5/2021 | Fröhlich .................. | H02K 1/32 |
| 11,056,941 | B2 * | 7/2021 | Matsumoto ............. | H02K 1/276 |
| 11,205,931 | B2 * | 12/2021 | Fröhlich ................. | H02K 7/003 |
| 11,205,939 | B2 * | 12/2021 | Yamaguchi .............. | H02K 9/19 |
| 11,309,756 | B2 * | 4/2022 | Kim ......................... | H02K 1/20 |
| 2010/0194220 | A1 * | 8/2010 | Tatematsu ................ | H02K 1/32 |
| | | | | 310/61 |
| 2013/0221772 | A1 * | 8/2013 | Miyamoto ............... | H02K 9/19 |
| | | | | 310/54 |
| 2019/0027987 | A1 * | 1/2019 | Fröhlich .................. | H02K 1/32 |

(Continued)

FOREIGN PATENT DOCUMENTS

| | | | | |
|---|---|---|---|---|
| DE | 102016210930 B4 * | 10/2021 | .............. | H02K 1/32 |
| JP | 4701895 B | 3/2011 | | |

*Primary Examiner* — Alex W Mok
(74) *Attorney, Agent, or Firm* — Rankin, Hill & Clark LLP

(57) ABSTRACT

A rotor of a rotating electric machine includes a rotor core equipped with a cooling passage, a first retaining member disposed on one end side of the rotor core, and a second retaining member disposed on another end side of the rotor core. An inlet-side through hole of the first retaining member is inclined with respect to an axis of the rotor. An outlet-side through hole of the second retaining member is inclined with respect to the axis of the rotor. When the rotor is rotated, a cooling gas is introduced into the cooling passage through the inlet-side through hole, and the gas is discharged from the cooling passage through an outlet-side through hole.

8 Claims, 6 Drawing Sheets

(56)     References Cited

U.S. PATENT DOCUMENTS

2019/0074742  A1*  3/2019  Matsumoto  .............. H02K 9/19
2019/0229571  A1*  7/2019  Yasuda  .................... H02K 1/32
2020/0204021  A1*  6/2020  Kim  ........................ H02K 9/19
2020/0244124  A1*  7/2020  Kang  ...................... H02K 1/32
2022/0209603  A1*  6/2022  Kim  ....................... H02K 5/203

* cited by examiner

F I G. 1
10
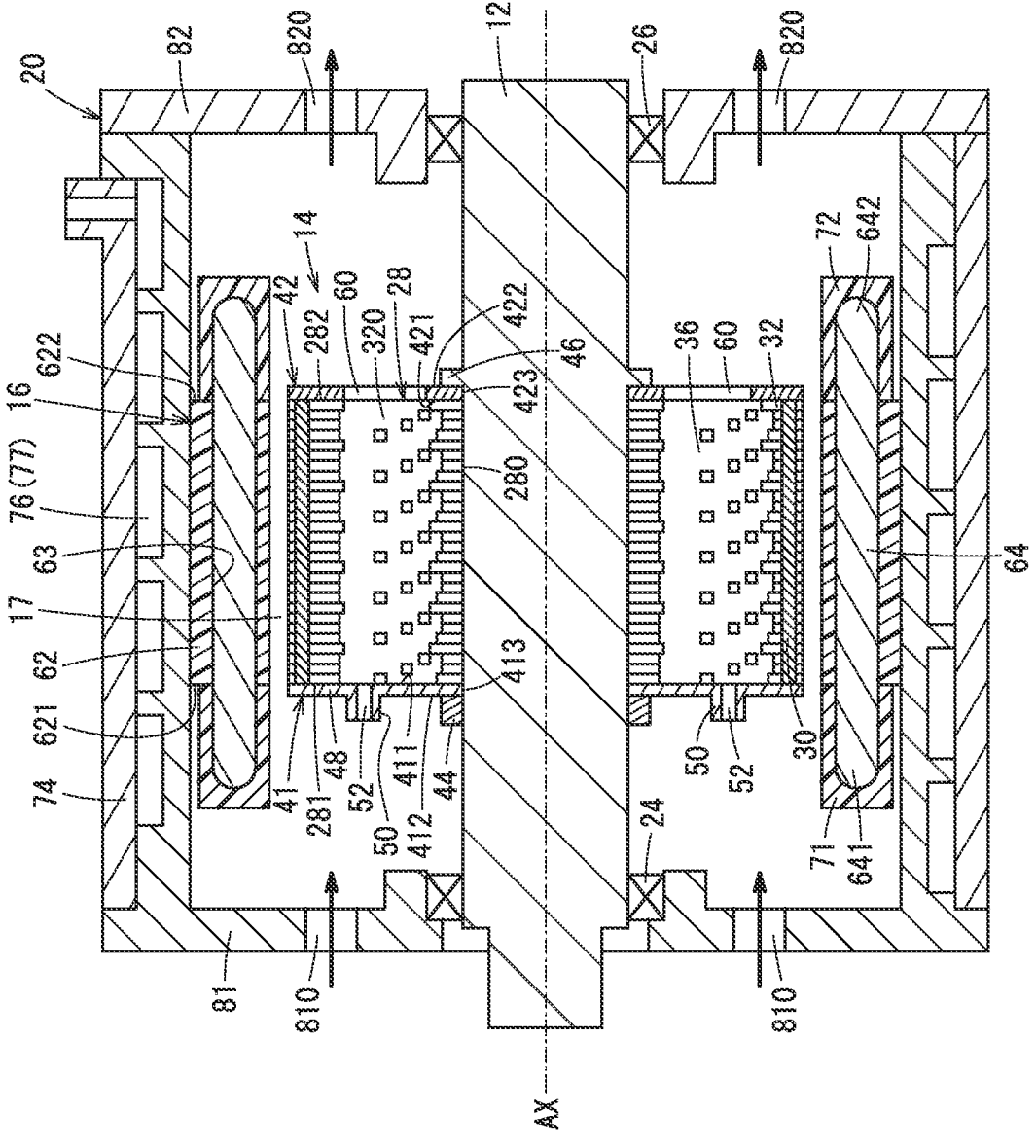

FIG. 6

ROTATING ELECTRIC MACHINE

CROSS-REFERENCE TO RELATED APPLICATIONS

This application is based upon and claims the benefit of priority from Japanese Patent Application No. 2022-156412 filed on Sep. 29, 2022, the contents of which are incorporated herein by reference.

BACKGROUND OF THE INVENTION

Field of the Invention

The present invention relates to a rotating electric machine.

Description of the Related Art

When a rotating electric machine generates heat and reaches a high temperature, the loss increases and the efficiency decreases, so it is desirable to cool the rotating electric machine. For example, in JP 4701895 B2, a dome type fan is provided in a rotor yoke for cooling a rotor of a rotating electric machine. The cooling air is introduced inside the rotor yoke by causing the air from the dome type fan to flow inside the rotor yoke.

SUMMARY OF THE INVENTION

In order to further enhance the rotor cooling performance, it is desired to make the introduced air flow more efficiently.

An object of the present invention is to solve the aforementioned problem.

According to an aspect of the present invention, a rotating electric machine is provided. The rotating electric machine includes a shaft and a rotor fixed to the shaft, wherein the rotor includes a rotor core supported by the shaft, a first retaining member disposed on one end side of the rotor core in an axial direction of the rotating electric machine, and a second retaining member disposed on another end side of the rotor core, the rotor core includes a cooling passage configured to allow communication between one end surface and another end surface of the rotor core in the axial direction, the first retaining member includes an inlet-side through hole communicating with the cooling passage, and the inlet-side through hole is inclined with respect to an axis of the rotor, the second retaining member includes an outlet-side through hole communicating with the cooling passage, and the outlet-side through hole is inclined with respect to the axis of the rotor, and when the rotor is rotated, a cooling gas is introduced into the cooling passage through the inlet-side through hole, and the cooling gas is discharged from the cooling passage through the outlet-side through hole.

According to the rotating electric machine of the present invention, the inlet-side through hole provided in the first retaining member promotes introduction of a cooling gas into a cooling passage in the rotor core. The discharge of gas from the cooling passage is promoted by the outlet-side through hole provided in the second retaining member. As a result, the rotating electric machine can cause the gas to efficiently flow through the cooling passage, so that the cooling performance of the rotor can be improved.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 1 is a schematic overall view of a rotating electric machine according to an embodiment of the present invention;

FIG. 6 is a schematic diagram of a propeller device provided with a rotating electric machine.

DETAILED DESCRIPTION OF THE INVENTION

Figure 2:
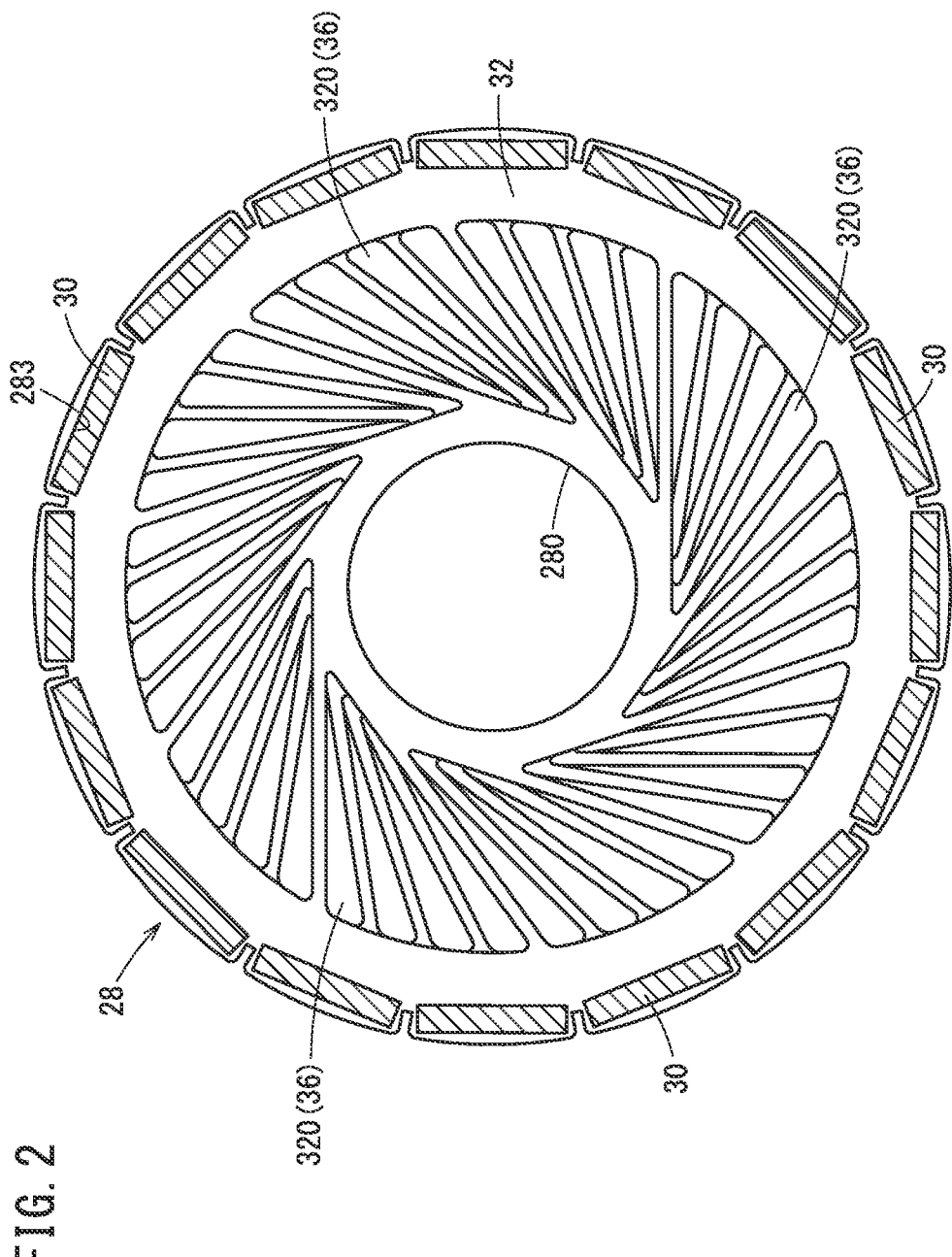
FIG. 2 is a plan view of electromagnetic steel plates constituting the rotor core.

A rotating electric machine 10 shown in FIG. 1 is an electric motor or an electrical power generator. The use of the rotating electric machine 10 is not particularly limited, and the rotating electric machine 10 is also used for vehicles such as two-wheeled vehicles and four-wheeled vehicles, aircrafts, ships, and the like. When the rotating electric machine 10 is an electric motor, for example, the rotating electric machine 10 can be used as a power source for driving a propeller 106 (see FIG. 6) of a flying object such as an aircraft. The rotating electric machine 10 has a shaft 12 rotatably supported, a rotor 14 fixed to the shaft 12, and a stator 16 surrounding the rotor 14. The rotating electric machine 10 further includes a casing 20 for accommodating the shaft 12, the rotor 14, and the stator 16.

The shaft 12 is disposed on an axis AX of the rotating electric machine 10. An axis AX is a central axis of the shaft 12. The shaft 12 is rotatably supported by a first bearing 24 and a second bearing 26 disposed at one end and another end of the casing 20, respectively. One end of the shaft 12 is connected to a load (for example, the propeller 106) via a transmission 102 (see FIG. 6), for example. The shaft 12 may be directly connected to the load without via the transmission 102.

The shaft 12 and the rotor 14 rotate integrally. The rotor 14 includes a rotor core 28 supported by the shaft 12 and a plurality of magnets 30 fixed to the rotor core 28. The rotor core 28 has a plurality of electromagnetic steel plates 32 laminated in the axial direction of the rotor 14. The rotor core 28 is a laminated body formed by laminating the plurality of electromagnetic steel plates 32. The rotor core 28 has a cylindrical shape having a central hole 280. The shaft 12 is inserted into the central hole 280 of the rotor core 28.

The rotor core 28 has a first end surface 281 and a second end surface 282 spaced apart in the axial direction. The first end surface 281 of the rotor core 28 is disposed between the first bearing 24 and the second end surface 282. The second end surface 282 of the rotor core 28 is disposed between the second bearing 26 and the first end surface 281. The rotor core 28 has a cooling passage 36 allowing communication between the first end surface 281 and the second end surface 282. Hole portions 320 formed in the plurality of electromagnetic steel plates 32 are connected to each other to form the cooling passage 36. The cooling passage 36 is formed radially inward of the rotor 14 relative to the magnets 30.

As shown in FIG. 2, each of the electromagnetic steel plates 32 has the plurality of hole portions 320 formed at intervals in the circumferential direction. Accordingly, the rotor core 28 has the plurality of cooling passages 36 formed at circumferentially spaced intervals. In FIG. 2, each of the hole portions 320 is formed in a triangular shape, but the shape of the hole portion 320 is not particularly limited, and other shapes (rectangular or trapezoidal shape) may be used.

In the present embodiment shown in FIG. 1, the plurality of electromagnetic steel plates 32 are arranged, with the phase in the circumferential direction being shifted by a predetermined angle, in units of one plate or in units of a plurality of plates. Therefore, the hole portions 320 formed in the plurality of electromagnetic steel plates 32 are connected to each other, so that each of the cooling passages 36 is formed in a spiral shape with the axis AX as the center. Since each of the cooling passages 36 extends spirally as described above, a swirling flow is generated in the cooling passage 36 by rotation of the rotor core 28.

As shown in FIG. 2, the plurality of magnets 30 are arranged at intervals in the circumferential direction on the outer circumferential portion of the rotor core 28 (electromagnetic steel plate 32). The outer circumferential portion of the rotor core 28 (electromagnetic steel plate 32) has a plurality of magnet mounting holes 283 formed at intervals in the circumferential direction. The plurality of magnet mounting holes 283 are formed radially outward relative to the plurality of hole portions 320. The plurality of magnets 30 are respectively inserted into the plurality of magnet mounting holes 283. Each of the magnets 30 is a permanent magnet.

As shown in FIG. 1, the rotor 14 further includes a first retaining member 41 disposed on one end side of the rotor core 28 in the axial direction of the rotating electric machine 10, and a second retaining member 42 disposed on the other end side of the rotor core 28.

The first retaining member 41 abuts against the first end surface 281 of the rotor core 28. The first retaining member 41 has an inner surface 411 facing the rotor core 28 and an outer surface 412 opposite to the inner surface 411, and the inner surface 411 abuts against the rotor core 28. The shaft 12 is inserted through a first insertion hole 413 formed at the center of the first retaining member 41. An inner circumferential portion of the first retaining member 41 is locked by a locking ring 44 fixed to the shaft 12.

The second retaining member 42 abuts against the second end surface 282 of the rotor core 28. The second retaining member 42 has an inner surface 421 facing the rotor core 28 and an outer surface 422 opposite to the inner surface 421, and the inner surface 421 abuts against the rotor core 28. The shaft 12 is inserted through a second insertion hole 423 formed at the center of the second retaining member 42. An inner circumferential portion of the second retaining member 42 is locked by an annular locking projection 46 fixed to the shaft 12. Since the rotor core 28 is retained between the first retaining member 41 and the second retaining member 42, the rotor core 28 is positioned in the axial direction with respect to the shaft 12.

Figure 3:
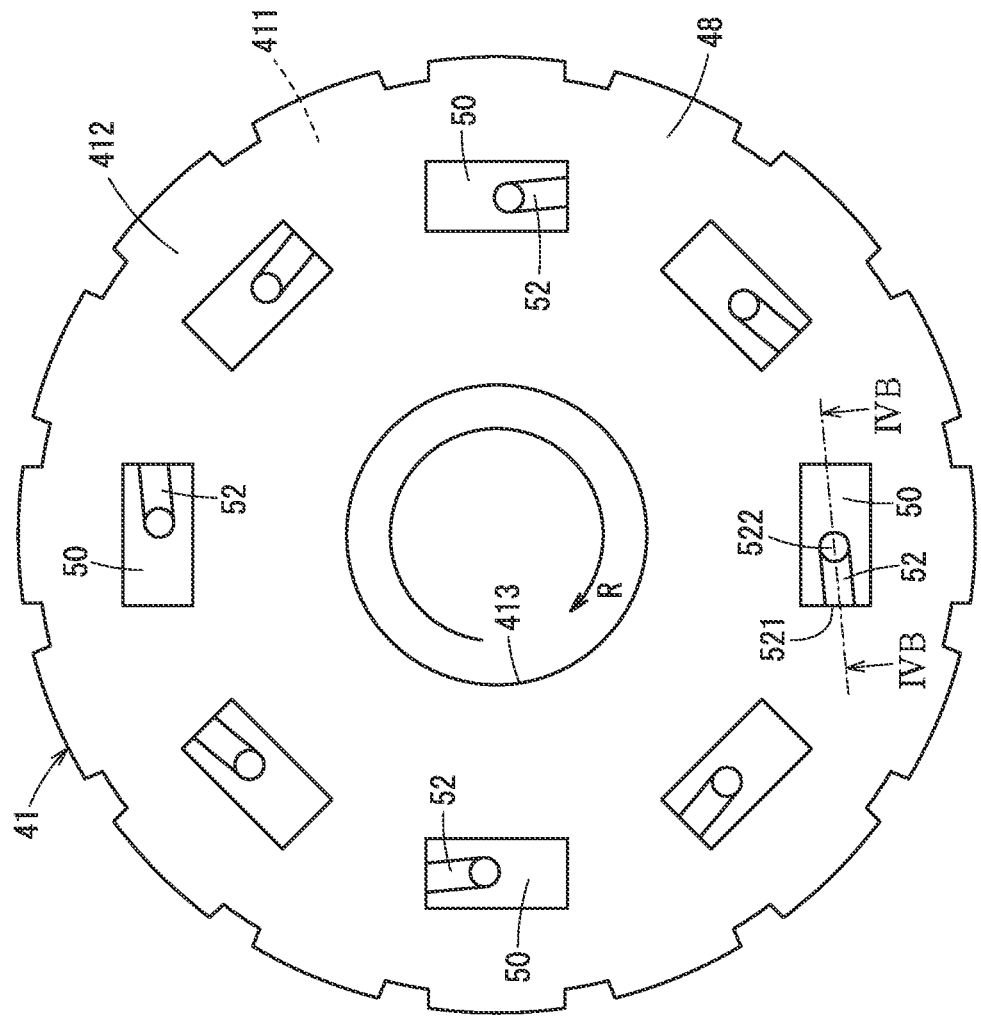
FIG. 3 is a plan view of a first retaining member.

As shown in FIG. 3, the first retaining member 41 is formed in an annular shape. The first retaining member 41 has a protruding portion 50 protruding toward the outside of the rotor 14 in the axial direction (see FIG. 1 as well). The first retaining member 41 has a flat annular base plate portion 48. The protruding portion 50 protrudes from the base plate portion 48 in the axial direction. The plurality of protruding portions 50 are circumferentially spaced from each other. In FIG. 3, the plurality of protruding portions 50 are arranged at equal intervals in the circumferential direction.

As shown in FIG. 1, the first retaining member 41 has an inlet-side through hole 52 communicating with the cooling passage 36. When the rotor 14 is rotated, the first retaining member 41 introduces a cooling gas (air) into the cooling passages 36 through the inlet-side through hole 52. As shown in FIG. 3, in the first retaining member 41, the plurality of inlet-side through holes 52 are formed at intervals in the circumferential direction. Each of the inlet-side through holes 52 is a tubular passage. The plurality of inlet-side through holes 52 are formed in the plurality of protruding portions 50, respectively.

Figure 4A:
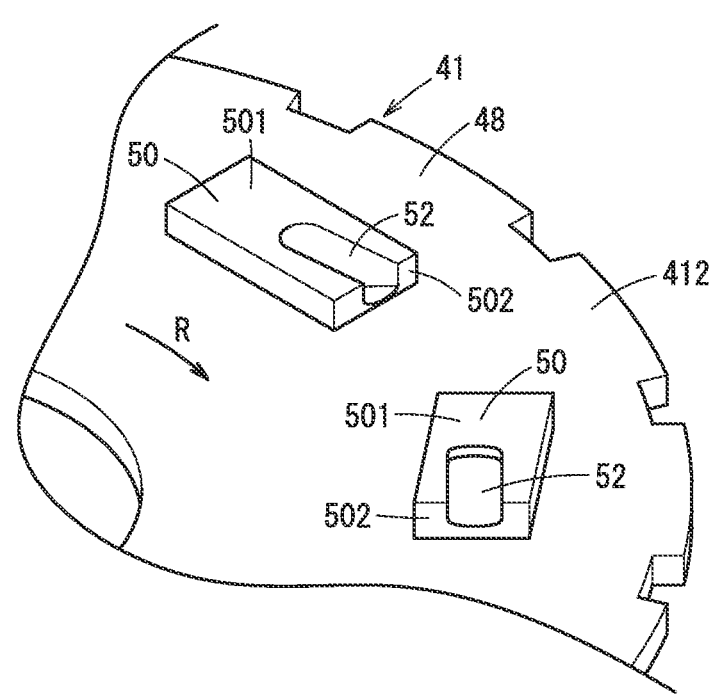
FIG. 4A is a cross-sectional perspective view of the first retaining member.

As shown in FIG. 4A, each of the protruding portions 50 has a protruding end surface 501 and an end surface facing forward in the rotational direction R of the rotor 14 (hereinafter referred to as a "rotational front end surface 502"). The inlet-side through hole 52 opens at the protruding end surface 501 and the rotational front end surface 502 of the protruding portion 50.

Figure 4B:
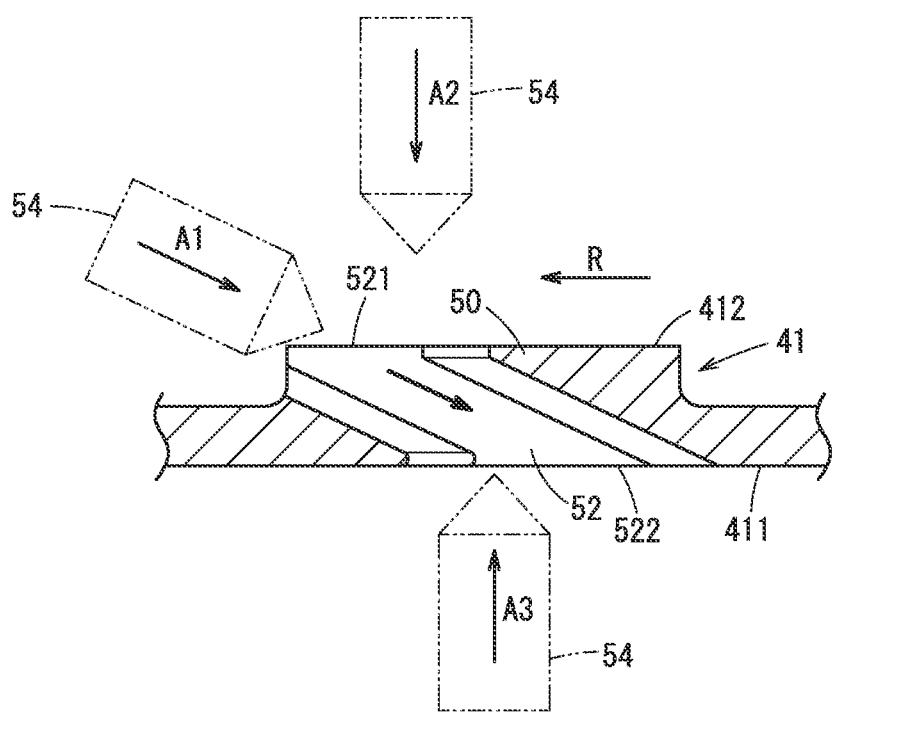
FIG. 4B is a cross-sectional view taken along line IVB-IVB in FIG. 3.

As shown in FIG. 4B, the inlet-side through hole 52 is inclined with respect to the axis AX (see FIG. 1) of the rotor 14. The inlet-side through hole 52 is formed in the protruding portion 50 such that the inlet-side through hole 52 is continuously inclined with respect to the axis AX. The inlet-side through hole 52 is inclined from the outer surface 412 of the first retaining member 41 toward the inner surface 411 thereof in a direction opposite to the rotational direction R of the rotor 14.

An example of a method for forming such an inlet-side through hole 52 will be described. For example, a through hole is formed by moving a cutting tool 54 (drill or the like) relative to the material of the first retaining member 41 in a direction A1 in FIG. 4B (a direction inclined with respect to the thickness direction of the first retaining member 41). Next, in order to remove the sharp edge of the through hole, the cutting tool 54 is moved in a direction A2 and a direction A3 (thickness directions of the first retaining member 41) in order to cut off the edge. The order of processing in the direction A2 and the direction A3 may be reversed.

The inlet-side through hole 52 has an upstream end opening 521 which opens on the outer surface of the protruding portion 50 and a downstream end opening 522 which opens on the inner surface 411 of the first retaining member 41.

As shown in FIG. 3, each of the inlet-side through holes 52 is inclined with respect to the circumferential direction of the rotor 14 such that the upstream end opening 521 of the inlet-side through hole 52 is located outside the downstream end opening 522 in the radial direction of the rotor 14.

Figures 5A, 5B:
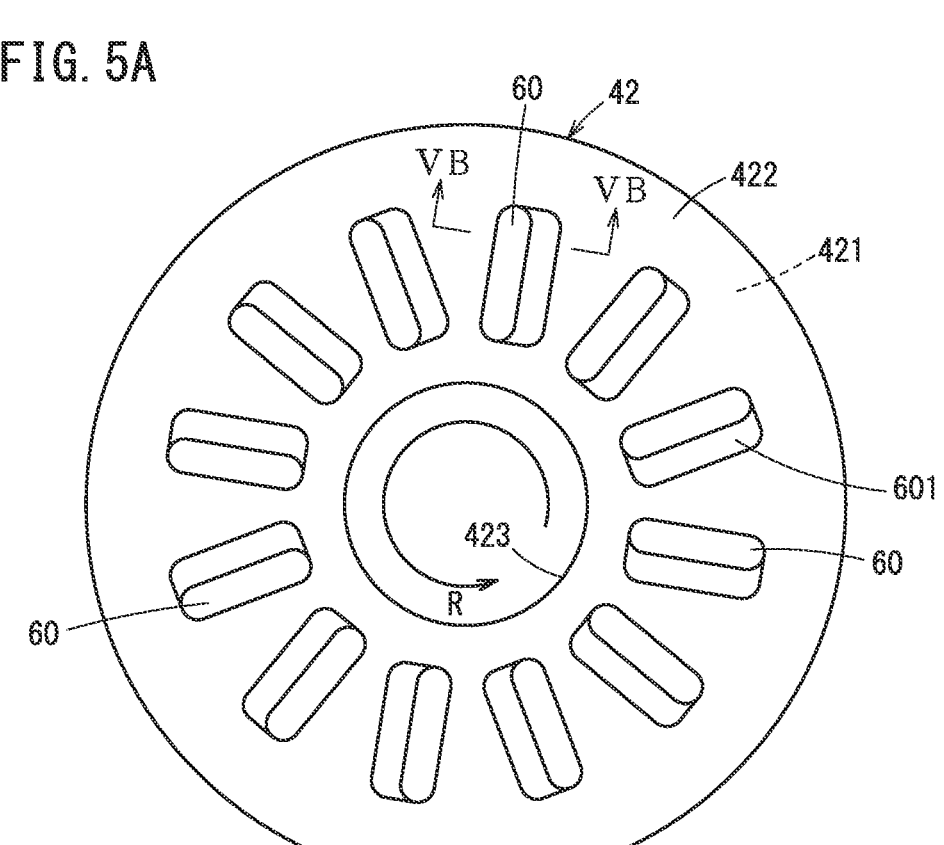
FIG. 5A is a plan view of a second retaining member.
FIG. 5B is a cross-sectional view taken along line VB-VB in FIG. 5A.

As shown in FIG. 1, the second retaining member 42 is formed in a flat plate shape. The second retaining member 42 has an outlet-side through hole 60 communicating with the cooling passage 36. When the rotor 14 is rotated, the second retaining member 42 discharges gas from the cooling passage 36 through the outlet-side through hole 60. The outlet-side through hole 60 penetrates from one end surface (inner surface 421) of the second retaining member 42 to the other end surface (outer surface 422). As shown in FIG. 5A, in the second retaining member 42, the plurality of outlet-side through holes 60 are formed at intervals in the circumferential direction. The outlet-side through holes 60 each have an elongated hole shape extending in the radial direction of the rotor 14.

The plurality of outlet-side through holes 60 are provided radially around the second insertion hole 423. In the present embodiment, the number of the outlet-side through holes 60 is larger than the number of the inlet-side through holes 52 (FIG. 3). The number of the outlet-side through holes 60 may be equal to or less than the number of the inlet-side through holes 52. The sum of the flow path areas of the plurality of outlet-side through holes 60 is larger than the sum of the flow path areas of the plurality of inlet-side through holes 52.

As shown in FIG. 5B, each of the outlet-side through holes 60 is inclined with respect to the axis AX (see FIG. 1) of the rotor 14. The outlet-side through hole 60 is inclined from the inner surface 421 of the second retaining member 42 toward the outer surface 422 in the direction opposite to the rotational direction R of the rotor 14. The outlet-side through hole 60 has inclined inner surfaces 601 which face each other in the circumferential direction of the rotor 14 and are inclined with respect to the axis AX of the rotor 14. One inclined inner surface 601 and another inclined inner surface 601 are parallel to each other.

An example of a method for forming such an outlet-side through hole 60 will be described. For example, a through hole is formed by moving a cutting tool 54 (drill or the like) relative to the material of the second retaining member 42 in a direction B1 in FIG. 5B (a direction inclined with respect to the thickness direction of the second retaining member 42). Next, in order to remove the sharp edge of the through hole, the cutting tool 54 is moved in a direction B2 and a direction B3 (thickness directions of the second retaining member 42) in order to cut off the edge. The order of processing in the direction B2 and the direction B3 may be reversed.

In FIG. 1, when the rotor 14 constructed as described above is rotated, the rotor 14 introduces a cooling gas (air) into the cooling passages 36 through the inlet-side through holes 52 and discharges the gas from the cooling passages 36 through the outlet-side through holes 60.

The stator 16 is formed in a hollow cylindrical shape and is fixed to the inner circumferential surface of the casing 20. An annular space extending in the axial direction is formed between the inner circumferential surface of the stator 16 and the outer circumferential surface of the rotor 14. The annular space is a gas flow path 17 through which gas flows. The stator 16 includes a stator core 62 and coils 64 held by the stator core 62. The coils 64 are inserted through a plurality of slots 63 formed in the stator core 62. The coils 64 have first coil end portions 641 projecting axially from one end surface 621 of the stator core 62, and second coil end portions 642 projecting axially from another end surface 622 of the stator core 62.

The stator 16 has a mold portion that covers the first coil end portions 641 and the second coil end portions 642. Specifically, the mold portion includes a first resin mold 71 and a second resin mold 72. The first resin mold 71 covers the first coil end portions 641 and is arranged along the annular one end surface 621 of the stator core 62. The first resin mold 71 is formed in an annular shape extending in the circumferential direction around the axis AX. The second resin mold 72 covers the second coil end portions 642 and is disposed along the annular other end surface 622 of the stator core 62. The second resin mold 72 is formed in an annular shape extending in the circumferential direction centered about the axis AX.

The casing 20 has a cylindrical circumferential wall portion 74 surrounding the stator 16, a first end wall portion 81 constituting one end portion of the casing 20 in the axial direction, and a second end wall portion 82 constituting the other end portion of the casing 20 in the axial direction. A water cooling passage 76 extending spirally is formed in the circumferential wall portion 74. That is, the circumferential wall portion 74 has a water jacket 77. The stator 16 is cooled by the water jacket 77.

The form of the stator 16 of the rotating electric machine 10 is not limited. For example, an air cooling system in which the circumferential wall portion 74 is cooled by being exposed to a gas (air) may be employed. The first coil end portions 641 and the second coil end portions 642 are not limited to the configuration in which they are covered with the first resin mold 71 and the second resin mold 72, and the outer surfaces of the first coil end portions 641 and the second coil end portions 642 may be treated by varnish application.

The first end wall portion 81 has a plurality of inflow ports 810 for introducing a cooling gas (air) into the casing 20. The second end wall portion 82 has a plurality of outflow ports 820 for discharging the cooling gas (air) from the casing 20. The gas is pressure-fed into the casing 20 through the inflow ports 810 by, for example, a blower (a fan 108 shown in FIG. 6 or a pump) arranged outside the rotating electric machine 10, and the gas is introduced into the cooling passages 36 in the rotor 14. The casing 20 may be provided with a gas circulation path as follows. In the circulation path, for example, the gas discharged from the cooling passages 36 is cooled in the casing 20 by, for example, the water jacket 77, and the cooled gas returns to the space around the first retaining member 41.

Figure 6:
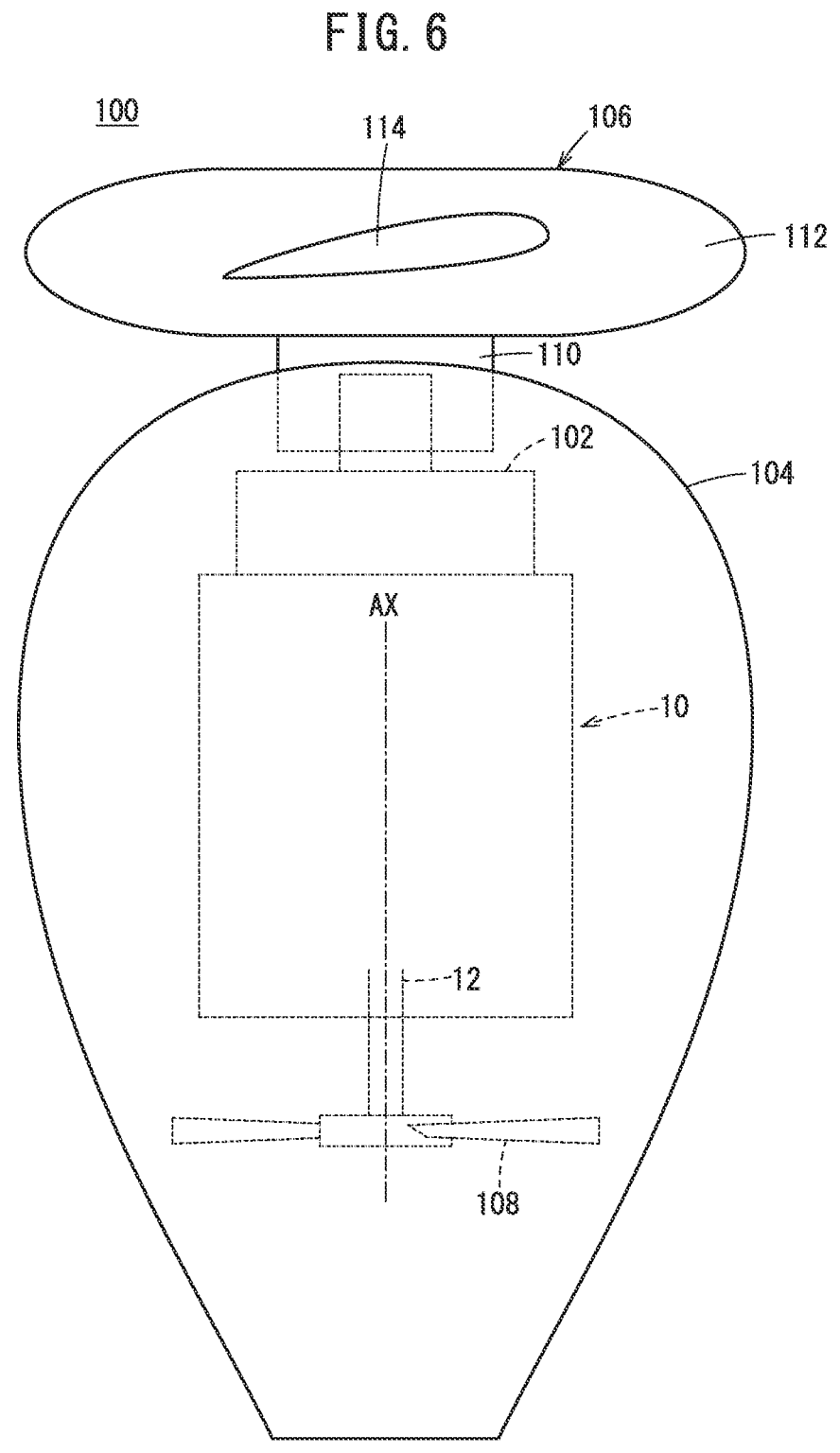

As shown in FIG. 6, the rotating electric machine 10 can be applied to a propeller device 100. The rotating electric machine 10 is not limited to a power source for the propeller device 100, but can be used as a power source for other devices. The propeller device 100 is provided with the rotating electric machine 10, the transmission 102 attached to the rotating electric machine 10, an accommodation member 104 for accommodating the rotating electric machine 10 and the transmission 102, and the propeller 106 connected to the transmission 102.

The propeller device 100 is used for a vertical take-off and landing aircraft, for example. Therefore, the rotating electric machine 10 is disposed such that the axis AX of the rotating electric machine 10 is directed in the vertical direction when the propeller device 100 is in use. The propeller device 100 may adopt a configuration in which the axis AX of the rotating electric machine 10 is directed substantially in the horizontal direction when the propeller device 100 is in use.

A fan 108 for generating an air flow in the accommodation member 104 is attached to a lower end of the shaft 12 of the rotating electric machine 10. The transmission 102 is, for example, a planetary gear mechanism, and is disposed on an upper part of the rotating electric machine 10. The propeller 106 includes a propeller shaft 110 connected to an output shaft of the transmission 102, a hub 112 provided at an upper end of the propeller shaft 110, and a plurality of blades 114 projecting radially outward from the hub 112.

According to the present embodiment, the following effects are obtained.

As shown in FIG. 1, the rotor core 28 includes the cooling passage 36. The first retaining member 41 includes the inlet-side through hole 52 communicating with the cooling passage 36. The second retaining member 42 includes the outlet-side through hole 60 communicating with the cooling passage 36. When the rotor 14 is rotated, the cooling gas is introduced into the cooling passage 36 through the inlet-side through hole 52, and the gas is discharged from the cooling passage 36 through the outlet-side through hole 60. The inclined inlet-side through hole 52 provided in the first retaining member 41 promotes the introduction of the cooling gas into the cooling passage 36 in the rotor core 28, and the inclined outlet-side through hole 60 provided in the second retaining member 42 promotes the discharge of the cooling gas from the cooling passage 36. As a result, this configuration can cause the gas to efficiently flow through the cooling passage 36, so that the cooling performance of the rotor 14 can be enhanced.

The first retaining member 41 includes the protruding portion 50 protruding toward the outside of the rotor 14 in the axial direction. As shown in FIG. 4B, since the inlet-side through hole 52 is formed in the protruding portion 50 so as to be continuously inclined with respect to the axis AX, the inflow of the gas into the cooling passage 36 can be promoted.

As shown in FIG. 3, the inlet-side through hole 52 includes the upstream end opening 521 which opens on the outer surface of the protruding portion 50 and the downstream end opening 522 which opens toward the rotor core 28. Since the upstream end opening 521 is located outside the downstream end opening 522 in the radial direction of the rotor 14, the flow velocity of the introduced gas can be increased, and the inflow of the gas into the cooling passage 36 can be further promoted.

As shown in FIG. 5B, the second retaining member 42 is formed in a flat plate shape. The outlet-side through hole 60 includes the inclined inner surfaces 601 facing each other in the circumferential direction of the rotor 14 and inclined with respect to the axis AX. According to this configuration, it is possible to promote the discharge of the gas from the cooling passage 36 without increasing the thickness of the second retaining member 42 (without providing a protruding portion). Accordingly, the cooling efficiency can be improved while suppressing an increase in the weight of the second retaining member 42.

In FIG. 1, the sum of the flow path areas of the plurality of outlet-side through holes 60 is larger than the sum of the flow path areas of the plurality of inlet-side through holes 52. With this configuration, by relatively increasing the pressure on the gas inlet side in the cooling passage 36 and relatively decreasing the pressure on the gas outlet side, the pressure difference between the inlet side and the outlet side can be increased and the flow of the gas in the cooling passage 36 can be promoted.

The inlet-side through holes 52 are tubular passages and are provided at intervals in the circumferential direction of the rotor 14. The outlet-side through holes 60 each have an elongated hole shape extending in the radial direction of the rotor 14, and are radially provided at intervals in the circumferential direction. According to this configuration, since the exhaust efficiency from the cooling passage 36 is enhanced by the plurality of outlet-side through holes 60 each having an elongated hole shape, it is possible to further promote the inflow of gas in the inlet-side through holes 52 which are tubular passages. It is adequate that the tubular passage of each of the inlet-side through holes 52 may have a round cross section. The cross section thereof may be an ellipse or an elongated circle without being limited to a perfect circle. It is adequate that the elongated hole shape of each of the outlet-side through holes 60 may be a hole shape extending in the radial direction. The elongated hole shape may be an ellipse, for example.

The rotor core 28 includes the plurality of electromagnetic steel plates 32 laminated in the axial direction. The cooling passage 36 is formed in a spiral shape by connecting the hole portions 320 formed in the plurality of electromagnetic steel plates 32. According to this configuration, since the cooling passage 36 is formed in a spiral shape, the inflow of gas into the cooling passage 36 can be promoted when the rotor 14 rotates.

The above-described embodiments are summarized as follows.

The above embodiment discloses the rotating electric machine (10) including the shaft (12) and the rotor (14) fixed to the shaft, wherein the rotor includes the rotor core (28) supported by the shaft, the first retaining member (41) disposed on one end side of the rotor core in the axial direction of the rotating electric machine, and the second retaining member (42) disposed on the other end side of the rotor core, the rotor core includes the cooling passage (36) configured to allow communication between one end surface (281) and the other end surface (282) of the rotor core in the axial direction, the first retaining member includes the inlet-side through hole (52) communicating with the cooling passage, and the inlet-side through hole is inclined with respect to the axis (AX) of the rotor, the second retaining member includes the outlet-side through hole (60) communicating with the cooling passage, and the outlet-side through hole is inclined with respect to the axis of the rotor, and when the rotor is rotated, a cooling gas is introduced into the cooling passage through the inlet-side through hole, and the cooling gas is discharged from the cooling passage through the outlet-side through hole.

The first retaining member may include the protruding portion (50) protruding to the outside of the rotor in the axial direction, and the inlet-side through hole may be formed in the protruding portion so as to be continuously inclined with respect to the axis.

The inlet-side through hole may include the upstream end opening (521) which opens on the outer surface of the protruding portion and the downstream end opening (522) which opens toward the rotor core, and the upstream end opening may be located outside the downstream end opening in a radial direction of the rotor.

The second retaining member may be formed in the flat plate shape, and the outlet-side through hole may include the inclined inner surfaces (601) facing each other in the circumferential direction of the rotor and inclined with respect to the axis.

The inlet-side through hole may include the plurality of inlet-side through holes, and the outlet-side through hole may include a plurality of outlet-side through holes, and the sum of flow path areas of the plurality of outlet-side through holes may be larger than the sum of flow path areas of the plurality of inlet-side through holes.

The inlet-side through hole may include the plurality of inlet-side through holes, each of the inlet-side through holes may be the tubular passage, and the plurality of inlet-side through holes may be provided at intervals in the circumferential direction of the rotor, and the outlet-side through hole may include the plurality of outlet-side through holes, each of the outlet-side through holes may have the elongated hole shape extending in the radial direction of the rotor, and the plurality of outlet-side through holes may be radially provided at intervals in the circumferential direction.

The rotor core may include the plurality of electromagnetic steel plates (32) laminated in the axial direction, and the cooling passage may be formed in the spiral shape by connecting hole portions (320) formed in the plurality of electromagnetic steel plates.

Moreover, it should be noted that the present invention is not limited to the disclosure described above, and various configurations may be adopted therein without departing from the essence and gist of the present invention.

The invention claimed is:

1. A rotating electric machine comprising a shaft and a rotor fixed to the shaft, wherein the rotor includes:

a rotor core supported by the shaft;

a first retaining member disposed on one end side of the rotor core in an axial direction of the rotating electric machine; and a second retaining member disposed on another end side of the rotor core, the rotor core includes a cooling passage configured to allow communication between one end surface and another end surface of the rotor core in the axial direction, the first retaining member includes an inlet-side through hole communicating with the cooling passage, and the inlet-side through hole is inclined with respect to an axis of the rotor, the first retaining member includes a protruding portion protruding away from an axial end surface of the first retaining member to an outside of the rotor in the axial direction, the protruding portion having a protruding end surface that extends linearly along a plane that is perpendicular to the axis of the rotor, the protruding end surface being distanced away from the axial end surface of the first retaining member in the axial direction, the inlet-side through hole includes:

an upstream end opening which opens on an outer surface of the protruding portion, the upstream end opening being at least partially defined by the protruding end surface of the protruding portion, and a downstream end opening which opens toward the rotor core, the second retaining member includes an outlet-side through hole communicating with the cooling passage, and the outlet-side through hole is inclined with respect to the axis of the rotor, and when the rotor is rotated, a cooling gas is introduced into the cooling passage through the inlet-side through hole, and the cooling gas is discharged from the cooling passage through the outlet-side through hole.

2. The rotating electric machine according to claim 1, wherein the inlet-side through hole is formed in the protruding portion so as to be continuously inclined with respect to the axis.

3. The rotating electric machine according to claim 2, wherein the upstream end opening is located outside the downstream end opening in a radial direction of the rotor.

4. The rotating electric machine according to claim 1, wherein the second retaining member is formed in a flat plate shape, and the outlet-side through hole includes inclined inner surfaces facing each other in a circumferential direction of the rotor and inclined with respect to the axis.

5. The rotating electric machine according to claim 1, wherein the inlet-side through hole comprises a plurality of inlet-side through holes, and the outlet-side through hole comprises a plurality of outlet-side through holes, and a sum of flow path areas of the plurality of outlet-side through holes is larger than a sum of flow path areas of the plurality of inlet-side through holes.

6. The rotating electric machine according to claim 5, wherein the inlet-side through hole comprises a plurality of inlet-side through holes, each of the inlet-side through holes is a tubular passage, and the plurality of inlet-side through holes are provided at intervals in a circumferential direction of the rotor, and the outlet-side through hole comprises a plurality of outlet-side through holes, each of the outlet-side through holes has an elongated hole shape extending in a radial direction of the rotor, and the plurality of outlet-side through holes are radially provided at intervals in the circumferential direction.

7. The rotating electric machine according to claim 1, wherein the rotor core includes a plurality of electromagnetic steel plates laminated in the axial direction, and the cooling passage is formed in a spiral shape by connecting hole portions formed in the plurality of electromagnetic steel plates.

8. The rotating electric machine according to claim 1, wherein the protruding portion includes a rotational front end surface facing forward in a rotational direction of the rotor, and the inlet-side through hole penetrates the protruding end surface and the rotational front end surface of the protruding portion, thereby expanding and opening onto the protruding end surface and the rotational front end surface.

\* \* \* \* \*